US010880840B1

(12) United States Patent
Mansour et al.

(10) Patent No.: US 10,880,840 B1
(45) Date of Patent: Dec. 29, 2020

(54) DYNAMIC ALLOCATION OF MAXIMUM UPLINK POWER

(71) Applicant: Sprint Communications Company L.P., Overland Park, KS (US)

(72) Inventors: Nagi A. Mansour, Arlington, VA (US); Maheshwaran Vijayakumar, Herndon, VA (US); Srinivas Rao Kanyagundla, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/750,147

(22) Filed: Jan. 23, 2020

(51) Int. Cl.
*H04W 52/14* (2009.01)
*H04W 52/24* (2009.01)
*H04W 4/029* (2018.01)

(52) U.S. Cl.
CPC ......... *H04W 52/146* (2013.01); *H04W 4/029* (2018.02); *H04W 52/242* (2013.01)

(58) Field of Classification Search
CPC .................................................. H04W 52/146
See application file for complete search history.

(56) References Cited

U.S. PATENT DOCUMENTS

| | | | |
|---|---|---|---|
| 2011/0039569 A1* | 2/2011 | Narasimha | H04W 52/241 455/452.2 |
| 2015/0271761 A1* | 9/2015 | Park | H04W 72/1242 370/329 |
| 2019/0223077 A1* | 7/2019 | Kwok | H04M 11/06 |
| 2019/0253988 A1* | 8/2019 | Khoshnevisan | H04W 52/20 |
| 2020/0128494 A1* | 4/2020 | Lu | H04W 88/06 |

OTHER PUBLICATIONS

First Action Interview Pilot Program Pre-Interview Communication dated May 13, 2020 in U.S. Appl. No. 16/426,734, 4 pages.
Notice of Allowance dated Jul. 29, 2020 in U.S. Appl. No. 16/426,734, 12 pages.
Preinterview First Office Action dated Dec. 26, 2019, in U.S. Appl. No. 16/134,858, 4 pages.
Notice of Allowance dated Aug. 26, 2020 in U.S. Appl. No. 16/134,858, 8 pages.

* cited by examiner

*Primary Examiner* — Ankur Jain

(57) ABSTRACT

Systems and methods are provided for dynamic power allocation of a first maximum uplink power and a second maximum uplink power, wherein the first maximum uplink power is used by a first transmitter to communicate with a first access point and the second maximum uplink power is used by a second transmitter to communicate with a second access point (dual connectivity). Historical data for a sector and one or more wireless communication devices is collected and analyzed to determine the modification of the first maximum uplink power and the second maximum uplink power.

20 Claims, 7 Drawing Sheets

US 10,880,840 B1

DYNAMIC ALLOCATION OF MAXIMUM UPLINK POWER

TECHNICAL FIELD

The present invention relates to dynamic power allocation for wireless communication devices on different communication protocols, substantially as shown in and/or described in connection with at least one of the figures, and as set forth more completely in the claims.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, the power transmission for each of two transmitters in a user equipment (UE) or wireless communication device (WCD) are proactively modified based on the analysis of historical data. As wireless technology advances, the technology used by WCDs to conduct wireless communication sessions between the WCD and an access point or base station is changing. Currently, WCDs transmit power between one or more wireless networks (e.g. 4G, 5G, etc.). Typically, a maximum uplink power is hard-set into a phone and is not capable of dynamic modification. As discussed herein, a maximum uplink power for each of two transmitters in a UE/WCD is dynamically adjusted in order to improve the ability of the WCD to have dual connectivity with a wireless telecommunications network so that throughput is improved.

Currently, based on an analysis of data, an access point communicates with the WCD, instructing it to ramp up the uplink power transmission at intervals until the optimal power level is reached for the wireless communication session. The uplink power transmission to a WCD would begin at a specified level somewhere below 23 dBm. The system would then ramp up the transmission power incrementally until the optimal transmission power for each protocol was reached. The incremental increase in uplink power transmission takes several steps and may lead to a diminished user experience. In the present system, the uplink power transmission is proactively modified based on one or more types of historical data collected and analyzed such as noise interference, time of day, and location of the WCD, resulting in the access point proactively instructing the WCD to adjust the maximum uplink power directly to the specific level determined. As such, the multiple steps of incrementally increasing uplink power transmission are eliminated by having the transmission power automatically and proactively set to the optimal power level, thereby leading to a more efficient and satisfactory user experience.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
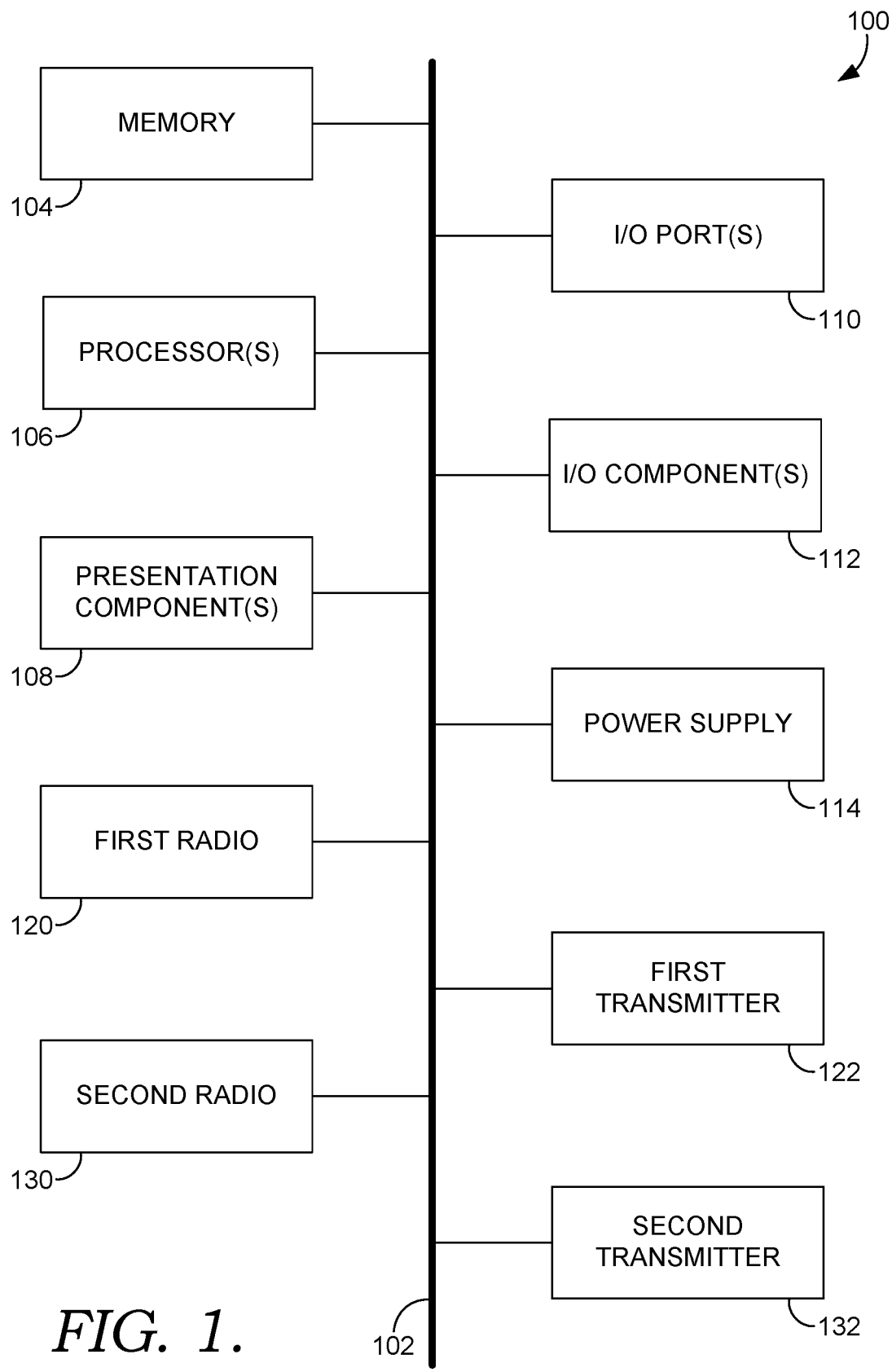
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a WCD according to a single protocol (e.g., 3G, 4G, LTE, 5G, and the like); however, in other aspects, a single access point may communicate with a WCD according to multiple protocols. As used herein, a base station may comprise one access point or more than one access point. Factors that can affect the telecommunications transmission include, e.g., location and size of the base stations, frequency of the transmission, among other factors.

As used herein, WCDs that are spatially distributed with respect to an access point may be said to be in different locations relative to the access point. Such distance-related terminology may be read to mean a distance at ground level between the ground level of the access point and the ground level of the device, it may refer to the distance actually traveled by the signal (in aspects, affected by multipath, reflection, etc.), and/or it may refer to a signal strength (e.g., a first device is further from an access point than a second device based on the downlink signal received at the first device being weaker than the downlink signal received at the second device).

A WCD can include any device employed by an end-user to communicate with a wireless telecommunications network. A WCD can include a mobile device, a mobile broadband adapter, or any other communications device employed to communicate with the wireless telecommunications network. A WCD, as one of ordinary skill in the art may appreciate, generally includes one or more antenna coupled to a radio for exchanging (e.g., transmitting and receiving) transmissions with a nearby base station.

Generally speaking, many modern WCDs comprise at least two transmitters; in some configurations, a WCD may operate using dual connectivity. That is, the WCD may use at least a first of its transmitters to communicate an uplink signal to a first access point and at least a second of its transmitters to communicate an uplink signal to a second access point. In other configurations, a WCD may operate using single connectivity, wherein it uses one or more of its transmitters to communicate with a single access point, base station, or cell site. Whether using dual connectivity or single connectivity, a WCD may have a pre-set maximum total uplink power (as will be discussed in greater detail below). Conventionally, a communication session between a WCD and an access point comprises an uplink handshake, wherein the uplink handshake is an uplink signal from the WCD to an access point, conventionally transmitted at the pre-set maximum uplink power. Once the handshake occurs, the network and/or the device may determine that the uplink power may be reduced (e.g., if, based on proximity or line of sight, it is determined that only half of the maximum pre-set uplink power is necessary to effectively propagate the uplink signal to the access point). The opposite, however, is not true; if the uplink handshake fails at the maximum pre-set uplink power, the WCD may not increase the power of the transmission (it may retry again later or attempt to connect to a different access point, for example).

Further, as communication protocols rapidly evolve from 3G, to 4G/LTE, to 5G, it is conceived that a WCD may benefit from connecting to more than one access point using more than one protocol. For example, a 5G communication session may have a higher throughput, used for a data session, and a 4G communication session may have characteristics that make it more suitable for a voice session. Thus, it may be desirable for the WCD to be simultaneously connected to more than one access point using more than one protocol.

The present disclosure is directed to systems, methods, and computer readable media that are an improvement over conventional communications between a WCD and an access point. In accordance with aspects described herein, network parameters, such as historic data for a sector and historical data for a wireless communication session between a WCD and each of a first access point and second access point can be collected and/or analyzed to dynamically determine how the device's maximum total uplink power should be allocated between the WCD's first maximum uplink power, used by the first transmitter, and the second maximum uplink power, used by the second transmitter. This allocation of maximum total uplink power between the first transmitter and the second transmitter improves WCD throughput for both the first transmitter and the second transmitter.

Being able to dynamically modify uplink power used by the first transmitter and the second transmitter enables the WCD to communicate more effectively. Further, this may permit the WCD to realize the full benefit of diverse protocols and wireless service features, such as the dependability of 4G and high-bandwidth of 5G (or to use the benefits of any other combination of two protocols). Further, by proactively determining the maximum uplink power so that the transmission power is initially set to the optimal value, it may allow the network to better balance WCDs between cell locations, expediting communication sessions, and consequently reducing network loads. From a WCD perspective, a device may be able to simultaneously communicate with two access points, increasing throughput.

Accordingly, a first aspect of the present disclosure is directed to a system for dynamically allocating maximum total uplink power in a first WCD comprising a first access point, the first access point configured to transmit a first wireless downlink signal to the first WCD and a second access point, the second access point configured to transmit a second wireless downlink signal to the first WCD. The system also comprises a processor that is configured to perform operations comprising: collecting historical data for a first sector comprising previous locations of one or more additional WCDs located within the sector; collecting historical data for the first WCD based on previous locations of the first WCD within the sector; analyzing the historical data for the first sector and the historical data for the first WCD; and in response to collecting the first sector historical data and the historical data for the first WCD, instructing the first WCD to dynamically modify each of a first maximum uplink power and a second maximum uplink power, wherein the first maximum uplink power is used by a first transmitter of the first WCD to transmit a first wireless uplink signal to the first access point and the second maximum uplink power is used by a second transmitter of the first WCD to transmit a second wireless uplink signal to the second access point.

A second aspect of the present disclosure is directed to a method for dynamic power allocation in a first wireless communications device. The method includes collecting historical data for a first sector comprising previous locations of one or more additional WCDs located within the sector; collecting historical data for the first WCD based on previous locations of the first WCD within the sector; analyzing the historical data for the first sector and the historical data for the first WCD; and in response to analyzing the first sector historic data and the historical data for the first WCD, instructing the first WCD to dynamically modify each of a first maximum uplink power and a second maximum uplink power, wherein the first maximum uplink power is used by a first transmitter of the first WCD to transmit a first wireless uplink signal to a first access point and the second maximum uplink power is used by a second transmitter of the first WCD to transmit a second wireless uplink signal to a second access point.

Another aspect of the present disclosure is directed to a non-transitory computer storage media storing computer-useable instructions that, when used by one or more processors cause the processors to collect historical data for a first sector comprising previous locations of one or more additional WCDs located within the sector; collect historical data for the first WCD based on previous locations of the first WCD within the sector; analyze the historical data for the first sector and the historical data for the first WCD; in response to analyzing the historic data for the first sector and the historical profile for the first WCD, instructing the first WCD to dynamically modify each of a first maximum uplink power and a second maximum uplink power, wherein the first maximum uplink power is used by a first transmitter of the first WCD to transmit a first wireless uplink signal to a first access point and the second maximum uplink power is used by a second transmitter of the first WCD to transmit a second wireless uplink signal to a second access point.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with a wireless telecommunications network. In aspects, the first radio 120 utilizes a first transmitter 122 to communicate with the wireless telecommunications network and the second radio 130 utilizes the second transmitter 132 to communicate with the wireless telecommunications network. Though two radios are shown, it is expressly conceived that a computing device with a single radio (i.e., the first radio 120 or the second radio 130) could facilitate communication with the wireless telecommunications network via both the first transmitter 122 and the second transmitter 132. Illustrative wireless telecommunications technologies include CDMA, GPRS, TDMA, GSM, and the like. One or both of the first radio 120 and the second radio 130 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
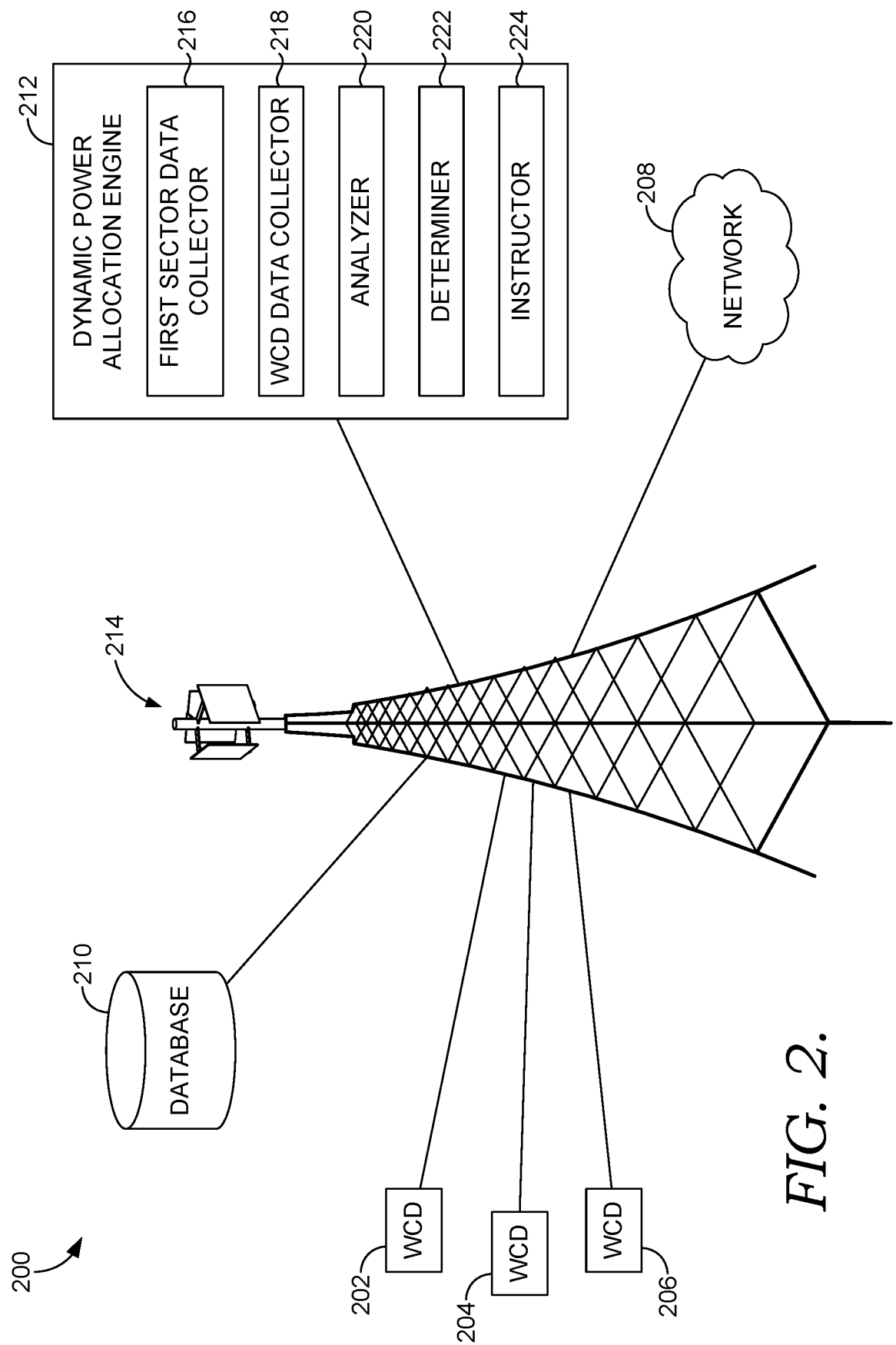
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes WCDs (202, 204, and 206), access point 214 (which may be a cell site, base station, or the like), network 208, database 210, and dynamic power allocation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the WCDs (202, 204, and 206) can correspond to computing device 100 in FIG. 1. Thus, a WCD can include, for example, a display(s), a power source(s) (e.g., a battery), a data store(s), a speaker(s), memory, a buffer(s), a radio(s) and the like. In some implementations, WCDs (202, 204, and 206) comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the WCDs (202, 204, and 206) in network environment 200 can optionally utilize network 208 to communicate with other computing devices (e.g., a mobile device(s), a server(s), a personal computer(s), etc.) through access point 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as WCDs 202, 204, and 206. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with user devices, such as WCDs 202, 204, and 206 that are located within the geographical area, or cell, covered by radio antennas of access point 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming. When a cell has users with user devices spatially separated from one another (e.g., high rise buildings, offices during the workday) at one time and spatially grouped together (e.g., nightclub, convention) at another time, traditional beamforming may not be able to capture most or all of the user devices at one time or another (or both) as adjusting a beamform only horizontally or only adjusting gain would not allow the beam to dynamically and simultaneously change in the x, y, and z planes (at least some change in each plane being consistent with the term 3D beamforming as used herein).

As shown, access point 214 is in communication with dynamic power allocation engine 212, which comprises various components that are utilized, in various implementations, to perform one or more methods for dynamically adjusting 3D beamforms emitted from an antenna array in one or more wireless communications networks. In some implementations, dynamic power allocation engine 212 comprises components including a first sector data collector 216, a WCD data collector 218, an analyzer 220, a determiner 222, and an instructor 224. However, in other implementations, more or less components than those shown in FIG. 2 may be utilized to carry out aspects of the invention described herein.

The first sector data collector 216 of the dynamic power allocation engine 212 is generally responsible for collecting historical data from one or more WCDs 202, 204, and 206 located within a sector and within coverage area of access point 214. Historical data sent from a WCD, such as WCD 202, to the access point 214 may comprise location past information of the WCD 202 and network parameters determined at or by the WCD 202 that includes information on how good or bad the communication channel quality is (SINR, pathless, or the like) and the device power levels (maximum uplink powers and maximum total uplink power). Location information may be based on GPS or other satellite location services, terrestrial triangulation, an access point location, or any other means of obtaining coarse or fine location information. The historical data collected may also include signal to noise ratio for one or more transitory signals communicated between the WCDs 202, 204, and 206 and each of a first communication protocol and a second communication protocol. Network parameters may indicate a realized uplink and/or downlink transmission data rate, observed signal-to-interference-plus-noise ratio (SINR) and/or signal strength at the user device, path loss, or throughput of the connection. Location and/or network parameters may take into account the WCD 202, 204, and 206 capability, such as the number of antennas and the type of receiver used for detection. Additionally, historical data collected by the first sector data collector 216 may also comprise path loss between the WCDs 202, 204, and 206 and each of the first communication protocol and the second communication protocol and sector interference in a predetermined geographical region or location. Further, the first sector data collector 216 may collect the at least one set of data at predetermined time intervals throughout the day or continuously and any and all variations of collection intervals are contemplated herein.

The first sector data collector 216 may also collect data regarding the how busy the given sector is during a specific time period. For example, a sector may have more WCDs present and utilizing the access point 214 at different times of the day. During rush hour, historical data for the first sector collected by the first sector data collector 216 may indicate a high volume of WCDs within the sector utilizing the access point 214 via different communication protocols. By contrast, during the midday or late evening, the historical data may indicate that there are generally fewer WCDs utilizing the access point 214.

The WCD data collector 218 is generally responsible for collecting historical data specific to the first WCD, including but not limited to the location of a first WCD within the sector. For example, the WCD data collector 218 may collect historical data for WCD 202 that includes the pervious locations of WCD 202 within the sector. The historical data collected by the WCD data collector 218 may also include data about the time of day and how often the WCD 202 is active within the sector, and prior maximum uplink powers to the first transmitter and the second transmitter.

The analyzer 220 is generally responsible for analyzing the historical data for the first sector and the historical data for the first WCD. Using on a variety of factors, such as the time of day, location of the first WCD, and the historical data for the first sector and first WCD, the analyzer 220 will conduct an analysis for the determination of what the maximum uplink power to each of a first transmitter and second transmitter needs to be in order to optimize power allocation and improve throughput. The analyzer 220 may also consider the quality of an uplink signal from the user device to determine if one of the first maximum uplink power and the second maximum uplink power should be increased to establish, maintain, and/or improve a wireless communication session with the access point 214.

The determiner 222 is generally responsible for determining a first maximum uplink power and a second maximum uplink power for a wireless communication session between the first WCD and the access point 214. After the analyzer 220 has analyzed the historical data for the first sector and the historical data for the first WCD, the determiner 222 will determine the maximum uplink power that will be used by a first transmitter (e.g. 4G/LTE) and a second maximum uplink power that will be used by a second transmitter (e.g. 5G). For example, based on historical data collected such as location of the WCD, time of day, and historical noise interference at the specific location for a relevant time period (e.g. same time of day or window of time within a day), the determiner 222 may determine that the first maximum uplink power should be at 10 dBm for an optimal wireless communication session between the first WCD and the access point. At the same time, the determiner 222 may determine that for the optimal wireless communication session between the first WCD and the access point 214, the second maximum uplink power should be at 3 dBm. The determiner 222 may determine that first maximum uplink power and second maximum uplink power are the same or different based on the variety of historical data analyzed by the analyzer 220.

In other aspects, the determiner 2222 may determine that the first maximum uplink power and the second maximum uplink power is 0 dBm or the maximum 29 dBm. Further, the sum of the first maximum uplink power and the second maximum uplink power cannot exceed 29 dBm. The determiner 222 may determine multiple first maximum uplink powers and second maximum uplink powers throughout a predetermined time period based on the analysis by the analyzer 220. Additionally, each modification of the first maximum uplink power and the second maximum uplink power may vary.

The instructor 224 is generally responsible for instructing the first WCD to dynamically modify a first maximum uplink power, wherein the first maximum uplink power is used by a first transmitter of the WCD to transmit a first wireless uplink signal to the first access point. The instructor 224 is also responsible for instructing the first WCD to dynamically modify the second maximum uplink power used by the second transmitter of the WCD to transmit a second wireless uplink signal to the second access point. For example, if the first transmitter is a 4G/LTE transmitter, the determiner 222, based on the analysis by analyzer 220, may determine that the maximum uplink power for the 4G/LTE transmitter should be 15 dBM. Additionally, the determiner 222, based on the analysis by analyzer 220, may determine that the maximum uplink power for the 5G transmitter, is 12 dBM. As such, the instructor 224 will then instruct the first WCD to dynamically modify the first maximum uplink power to 15 dBm and the second maximum uplink power to 12 DbM. It is contemplated that this instruction to modify each of the first maximum uplink power and the second maximum uplink power may occur prior to any actual data transmission from the WCD to the first access point and the second access point. In other words, the instructor 224 may instruct the dynamic modification of the first maximum uplink power and the second maximum uplink power before any wireless uplink signals are transmitted. This is different from previous technology, in which the uplink transmission was ramped up at intervals until the optimal power level is reached for the wireless communication session.

Figure 3:
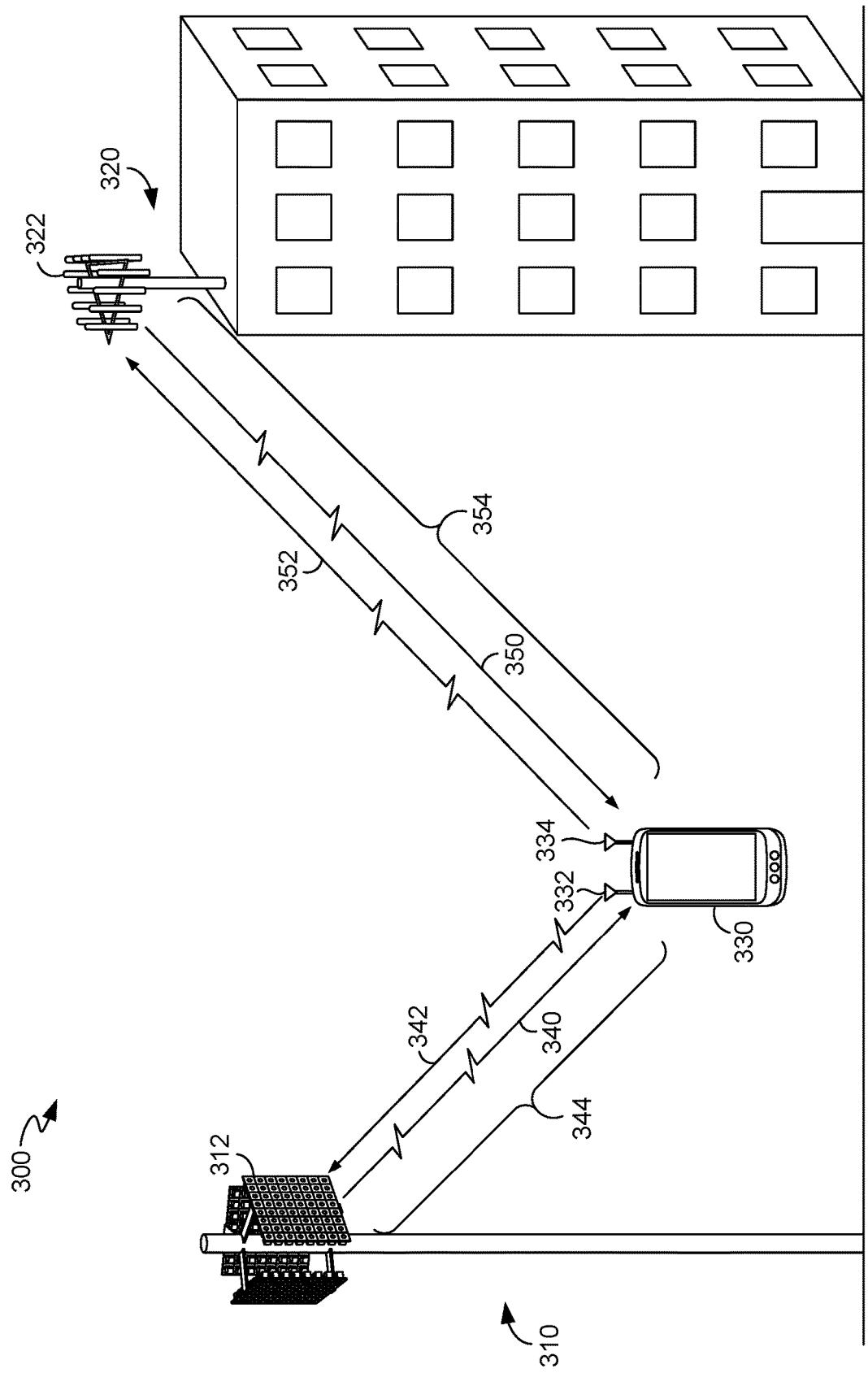
FIG. 3 depicts a representation of a first and second access point wirelessly communicating with a WCD in accordance with aspects herein.

Turning now to FIG. 3, a representation of a system 300 comprises a first access point 312 and a second access point 322 wirelessly communicating with a WCD 330 in accordance with aspects herein. The first access point 312, the second access point 322, and the WCD 330 are but one example of suitable configurations and are not intended to suggest any limitations as to the scope of use or functionality of embodiments described herein. Neither should the configuration be interpreted as having any dependency or requirement relating to any one or combination of components illustrated.

In some aspects, the first access point 312 comprises a 5G or MIMO access point, and the second access point 322 comprises a 4G or eNodeB access point. That is, the first access point 312 may wirelessly communicate with the WCD 330 via a 5G wireless communication protocol, and the second access point 322 may wirelessly communicate with the WCD 330 via a 4G wireless communication protocol. In other aspects, the first access point 312 may be any of a first type of access point configured to wirelessly communicate with the WCD 330 via a first wireless communication protocol, and the second access point 322 may be any of a second type of access point configured to wirelessly communicate with the WCD 330 via a second wireless communication protocol. In other words, each of the first access point and second access point may communicate with the WCD 300 using an eNodeB, gNodeB or a nodeB. For example, the first access point 312 may be an eNodeB, capable of wirelessly communicating with the WCD 330 via 4G or LTE communication protocols. The second access point 322 may be a nodeB, capable of wirelessly communicating with the WCD 330 via 3G. In further aspects, each of the first access point 312 and the second access point 322 may comprise both a 4G and 5G access point. Any combination thereof is expressly conceived and the present disclosure is not limited to any one or more particular types of access points nor any one or more particular types of wireless communication protocols.

The first access point 312 may be said to be located on or near a first base station 310 at a first site. The second access point 322 may be said to be located on or near a second base station 320 at a second site. While shown strictly for illustrative purposes, the first access point 312 is shown on a tower and the second access point 322 is shown atop a structure; however, the first access point 312 and/or the second access point 322 may be disposed in a variety of manners, including but not limited to, on a tower, on a structure, disposed on a mobile asset (e.g., a vehicle), in the window of a building, or the like. Further, despite the first access point 312 and the second access point 322 being shown as macro cells, the first access point 312 and/or the second access point 322 may be a macro cell, micro cell, femto cell, small cell, router, repeater, or any other nexus between the wireless communication device and the wireless network.

As seen in FIG. 3, the first access point 312 may communicate a first wireless downlink signal 340 to the WCD 330, and a first transmitter 332 of the WCD 330 may communicate a first wireless uplink signal 342 to the first access point 312. The second access point 322 may communicate a second wireless downlink signal 350 to the WCD 330, and a second transmitter 334 of the WCD 330 may communicate a second wireless uplink signal 352 to the second access point 322. Any one or more of the first access point 312 and the second access point 322 may comprise and/or be coupled to (including communicatively coupled to) a processor, such as a server, database, computer, a combination of components such as the dynamic power allocation engine 212, a radio, a controller, or the like. In aspects, the processor may be configured to perform operations comprising determining at least one network perimeter for a wireless communication session between the WCD 330 and each of the first access point 312 and the second access point 322. In response to such a determination, the processor may instruct the WCD 330 to dynamically modify each of the first maximum uplink power and a second maximum uplink power, wherein the first maximum uplink power is used by the first transmitter 332 to transmit the first wireless uplink signal 342 to the first access point 312 and a second maximum uplink power is used by the second transmitter 334 to transmit a second wireless uplink signal 352 to the second access point 322.

As seen in FIG. 3, in instances where the first access point 312 and the second access point 322 are not co-located, it can be said that both the first wireless downlink signal 340 and the first wireless uplink signal 342 travel a first distance 344 between the first access point 312 and the WCD 330. It can be said that both the second wireless downlink signal 350 and the second wireless uplink signal 352 travel a second distance 354 between the second access point 322 and the WCD 330.

The first access point 312 of FIG. 3 is configured to transmit a first wireless downlink signal to the first WCD 330 and the second access point 322 is configured to transmit a second wireless downlink signal to the first WCD. Prior to the transmission of any uplink signals from the WCD 330 to either the first access point 312 or the second access point 322, the first sector data collector 216 collects historical data for the first sector in which the WCD 330 is located. This historical data will include, but is not limited to various data points including how busy the given sector is at the same time of day in the past, and the number of other WCDs present in the sector at the same time in the past. The WCD data collector 218 will also collect the historical data related to WCD 330. For example, the WCD data collector 218 may collect the historical data for the first WCD 330 relating to the WCD's prior location and activity in the sector, with the first access point 312 or with the second access point 322. In other aspects, the dynamic power allocation engine 212 may receive an indication that a first wireless downlink signal has been received by the first WCD 330 from the first access point and a second wireless downlink signal has been received by the first WCD 330 from the second access point 322 prior to the collection of the historical data for the first sector and the historical data for the first WCD 330.

Once the historical data is collected, the analyzer 220 analyzes the historical data of the first sector and the first WCD 330 and the determiner 222 determines a first maximum uplink power and a second maximum uplink power. Then, the instructor 224 will instruct the first WCD 330 to dynamically modify each of the first maximum uplink power and the second maximum uplink power. The modification of each of the first maximum uplink power and the second maximum uplink power is done in order to optimize the power allocation between the first access point 312 and the second access point 322 so that the first WCD 330 can have better throughput. As such, based on the historical data, the split of power between the first transmitter 332 of the WCD 330 and the second transmitter 334 of the first WCD 330 is determined and modified to create the most optimal wireless communication session. By utilizing the historical sector data and historical data for the first WCD 330, the dynamic power allocation engine 212 is able to modify, via its components, the first maximum uplink power and the second maximum uplink power so that the load of the sector is taken into consideration. In all instances, the dynamic modification of the first maximum uplink power and the second maximum uplink power are such that the sum does not exceed the WCD's capability. The optimization of the system allows for power sharing between the first uplink signal and the second uplink signal to achieve the best combined data rate and the best sector throughput.

Figure 4:
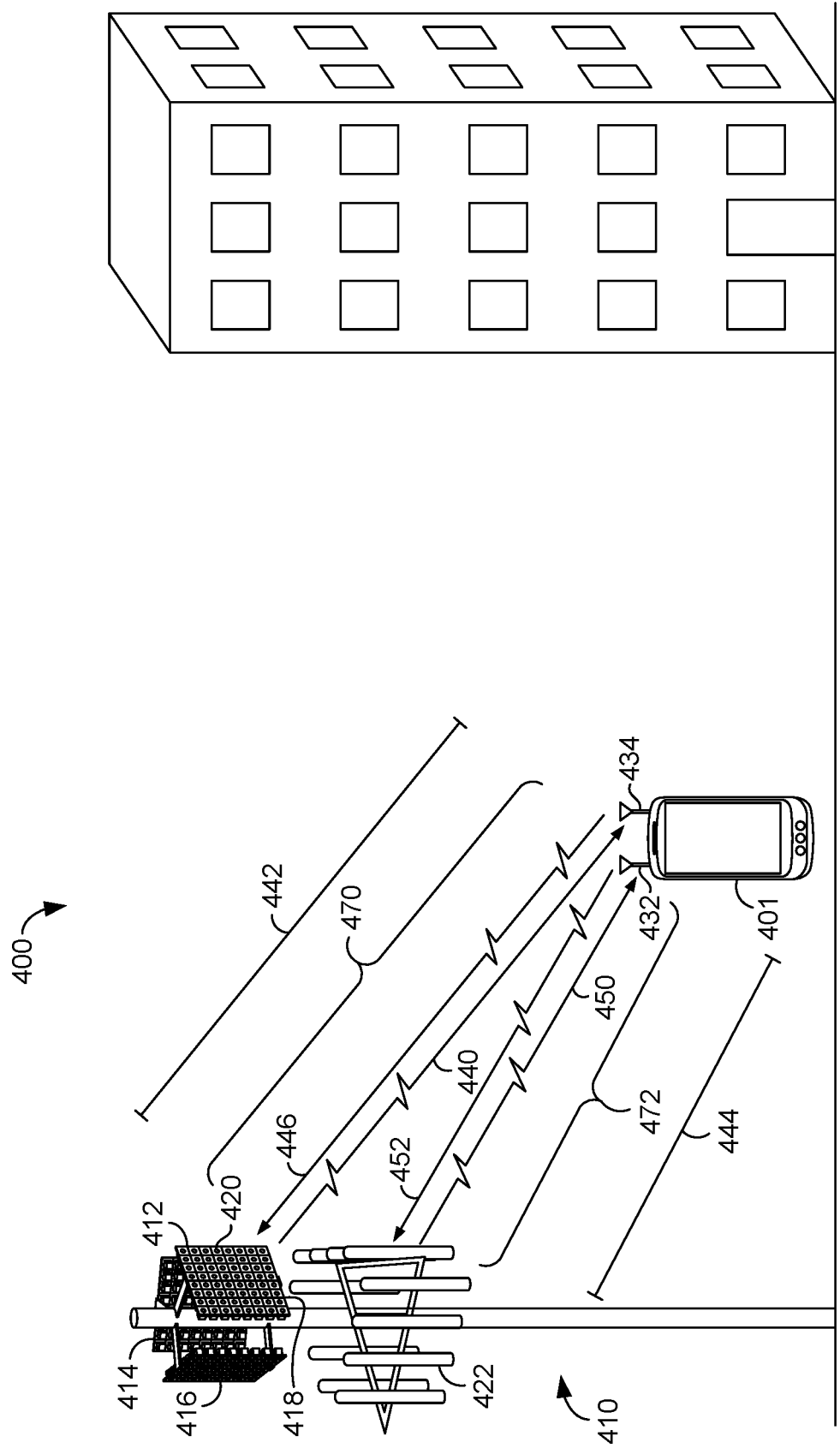
FIG. 4 depicts another exemplary representation of a first and second access point wirelessly communicating with a WCD in accordance with aspects herein.

Next, FIG. 4 illustrates a representation of another exemplary system 400 comprising an access point 410 wirelessly communicating with a WCD 401 in accordance with aspects herein. In this instance, the system comprises a single access point 410 that comprises a first node 412 and a second node 422. The access point 410 and the WCD 401 are but one example of suitable configurations and are not intended to suggest any limitations as to the scope of use or functionality of embodiments described herein. For example, in other aspects, the system 400 may comprise additional access points for wireless communication sessions with the WCD 401. In some aspects, the access point 410 may also be a base station. FIG. 4 illustrates one example of a suitable configuration and is not intended to suggest any limitations as to the scope of use or functionality of embodiments described herein. Neither should the configuration be interpreted as having any dependency or requirement relating to any one or combination of components illustrated.

As shown, the first node 412 and second node 422 may be co-located at the same access point 410. However, alternatively, the first node 412 and second node 422 may be located at different access points, resulting in multiple access points 410 (not shown). As used herein, the term node is used to refer to network access technology, such as eNode, gNode, etc. In other aspects, the term node may be used to refer to one or more antennas being used to communicate with the WCD 401. In aspects, the one or more antennas may be dipole antennas, having a length, for example, of ¼, ½, 1, or 1½ wavelength. In aspects, the antenna array may be an active antenna array, FD-MIMO, massive MIMO, 3G, 4G, 5G, and/or 802.11. While dipole antennas are referred to herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive).

In some aspects, the access point 410 comprises a first node 412 that is a 5G or MIMO node, and a second node 422 that is a 4G or eNodeB node. As such, the first node 412 may wirelessly communicate with the WCD 401 via a first communication protocol 470 (5G), and the second node 422 may wirelessly communicate with the WCD 401 via a second communication protocol 472 (4G). In other aspects, the first node 412 may be any of a first type of node configured to wirelessly communicate with the WCD 401 via the first communication protocol 470, and the second node 422 may be any of a second type of node configured to wirelessly communicate with the WCD 401 via the second communication protocol 472. For example, the first node 412 may be an eNodeB, capable of wirelessly communicating with the WCD 401 via 4G or LTE communication protocols. The second node 422 may be a nodeB, capable of wirelessly communicating with the WCD 401 via 3G. Any combination thereof is expressly conceived and the present disclosure is not limited to any one or more particular types of access points nor any one or more particular types of wireless communication protocols.

Additionally, as shown in FIG. 4, the first node 412 comprises three antenna arrays 414, 416, and 418, each comprising 64 antennas 420 arranged in an 8×8 structure. In other aspects, the first node 412 may comprise antennas arranged in an 8×4, 4×8, or 4×4 configuration. Each of the antenna arrays 414, 416, and 418 comprises a dedicated power supply (not shown). The power supply supplies power having a certain phase and amplitude to each antenna array 414, 416, and 418. In an embodiment, the power supply comprises a power amplifier and power controller. In other aspects, the power supply may additionally comprise a processor for making power supply determinations.

The second node 422 also comprises multiple separate antennas. The antennas found on the first node 412 and second node 422 differ in construction, technology and capability. However, it is contemplated that in some aspects, the first node 412 and second node 422 may comprise similar or the same types of antennas and each node may comprise one or more antennas. Also, as shown, the first node 412 and the second node 422 are located atop a structure; however, the first node 412 and second node 422 may be disposed in a variety of manners, including but not limited to, on a tower, on a structure, disposed on a mobile asset (e.g., a vehicle), in the window of a building, or the like. Further, despite the first node 412 and the second node 422 being shown as macro cells, the first node 412 and/or the second node 422 may be a macro cell, micro cell, femto cell, small cell, router, repeater, or any other nexus between the wireless communication device and the wireless network.

In an embodiment, the position of WCD 401 is determined. In aspects, WCD 401 provides historic location and channel quality information to the wireless communication network via the access point 410. Additionally, the system may collect historical data for the sector and WCD 401 from a database (not shown). Historical location information may be based on a last known position utilizing GPS or other satellite location services, terrestrial triangulation, an access point's physical location, or any other means of obtaining coarse or fine location information. Additionally, historical information may include previous channel quality information that may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point 410 or at the individual antenna array of the access point 410. In other aspects, the processing of said information may be done remotely.

Further, historical positions of a plurality of WCD 401 within the cell may be analyzed to forecast likely positions of WCD 401 and associated channel quality. In such an embodiment, historical location and channel quality information of the type described above may be analyzed to determine an average distribution and channel quality of a plurality of WCD 401 within a cell at a predetermined time. Such forecasts may be different during the working hours of a business day, for example, than a Friday evening, which may yet be different than during a Sunday morning. Analyzed historical data and accompanying forecasts may be as granular as 7:30 am-8:30 am on a Monday morning (corresponding to Monday morning rush hour) or as broad as August-May (corresponding to an example of a school year).

In yet another embodiment, historical network data may be collected and used, at least in part, to determine the first maximum uplink power and the second maximum uplink power. Historical network data may be processed locally at the access point 410, or the individual antenna array of the access point. In other aspects, the network data may be processed remotely. Historical network data may include tonnage, number of connected devices, registration address of devices, and/or biographic information associated with one or more user devices supplied by a registration and/or AAA system.

As illustrated in FIG. 4, the first node 412 may communicate a first wireless downlink signal 440 to the WCD 401, and a first transmitter 434 of the WCD 401 may communicate a first wireless uplink signal 446 to the first node 412. The second node 422 may communicate a second wireless downlink signal 450 to the WCD 330, and a second transmitter 432 of the WCD 330 may communicate a second wireless uplink signal 452 to the second node 422. Any one or more of the first node 412 and the second node 422 may comprise and/or be coupled to (including communicatively coupled to) a processor, such as a server, database, computer, a combination of components such as the dynamic power allocation engine 212, a radio, a controller, or the like. In aspects, the processor may be configured to perform operations comprising modifying the first maximum uplink power used by the first transmitter 434 to transmit the first wireless uplink signal 446 to the first node 412 and the second maximum uplink power used by the second transmitter 432 to transmit the second wireless uplink signal 452 to the second node 422.

As seen in FIG. 4, the first wireless downlink signal 440 and the second wireless downlink signal 450, while co-located on the same access point 410, may travel different distances between the access point 410 where the first node 412 and the second node 422 and the WCD 401. As such, the first wireless downlink signal 440 and the first wireless uplink signal 446 may travel a first distance 442 between the first node 412 and the WCD 401. The second wireless downlink signal 450 may travel a second distance 444 between the first node 412 and the WCD 401. Alternatively, it is possible that when the first node 412 and second node 422 are co-located, the first wireless downlink signal 440, the first wireless uplink signal 446, the second wireless downlink signal 450, and the second wireless uplink signal 452 travel the same distance.

As previously mentioned, the system 400, via the first sector data collector 216 and the WCD data collector 218 will collect historical data for the sector and WCD 401. Then, the analyzer 2220 analyzes historical data for the first sector and the historical data for the first WCD (e.g. noise interference, location, time of day, etc.). Once the analysis is performed, the determiner 222 will determine the first maximum uplink power and the second maximum uplink power. Then, the instructor 224 instructs the WCD 401 to dynamically modify each of a first maximum uplink power and a second maximum uplink power.

Figure 5A:
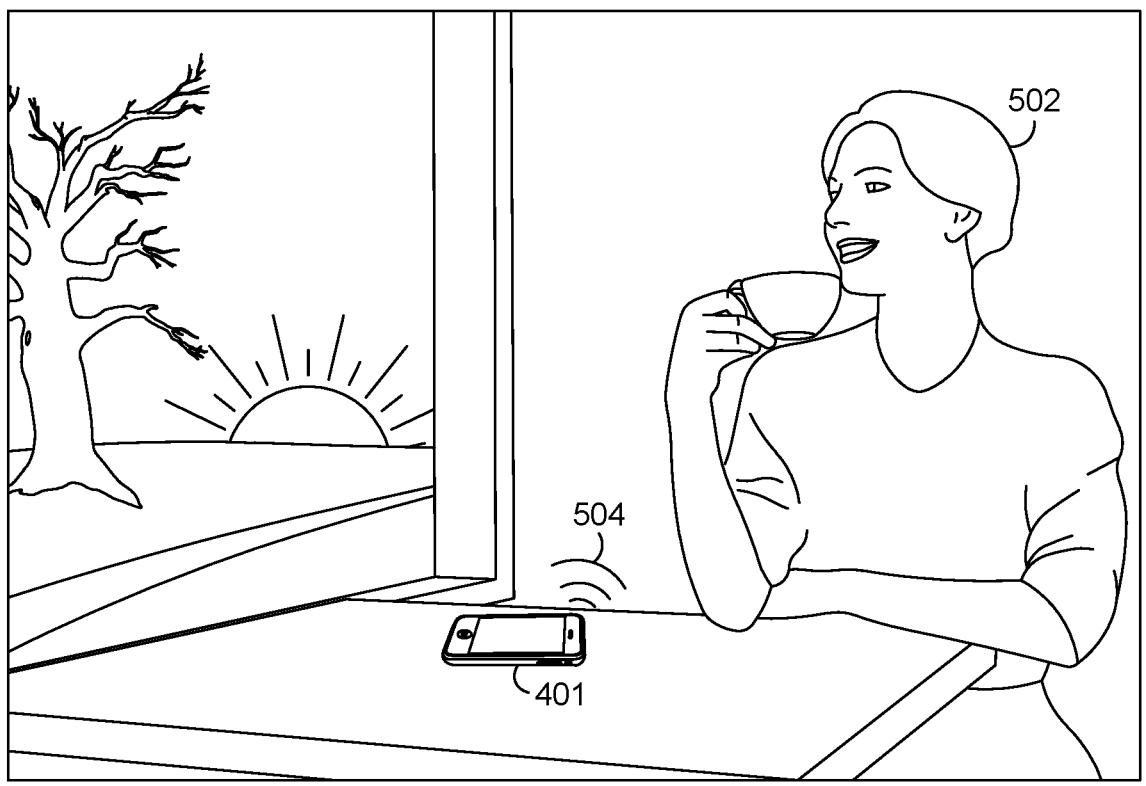
FIGS. 5a-5c depict various scenarios in which one or more wireless communication sessions are active between a WCD and an access point, in accordance with aspects herein.
Figure 5B:
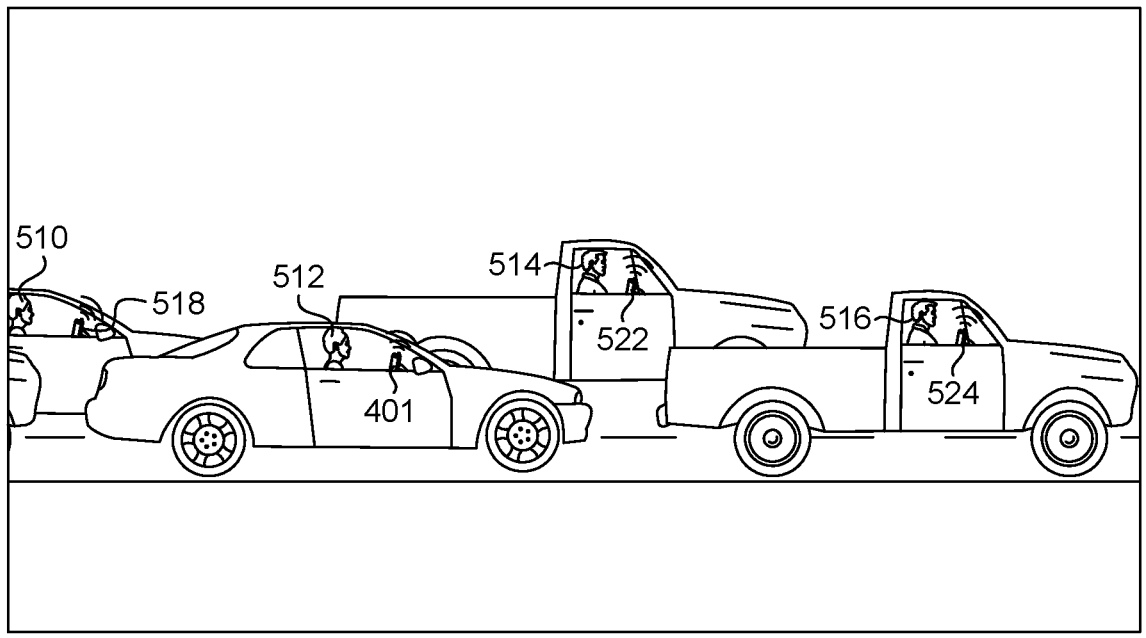
Figure 5C:
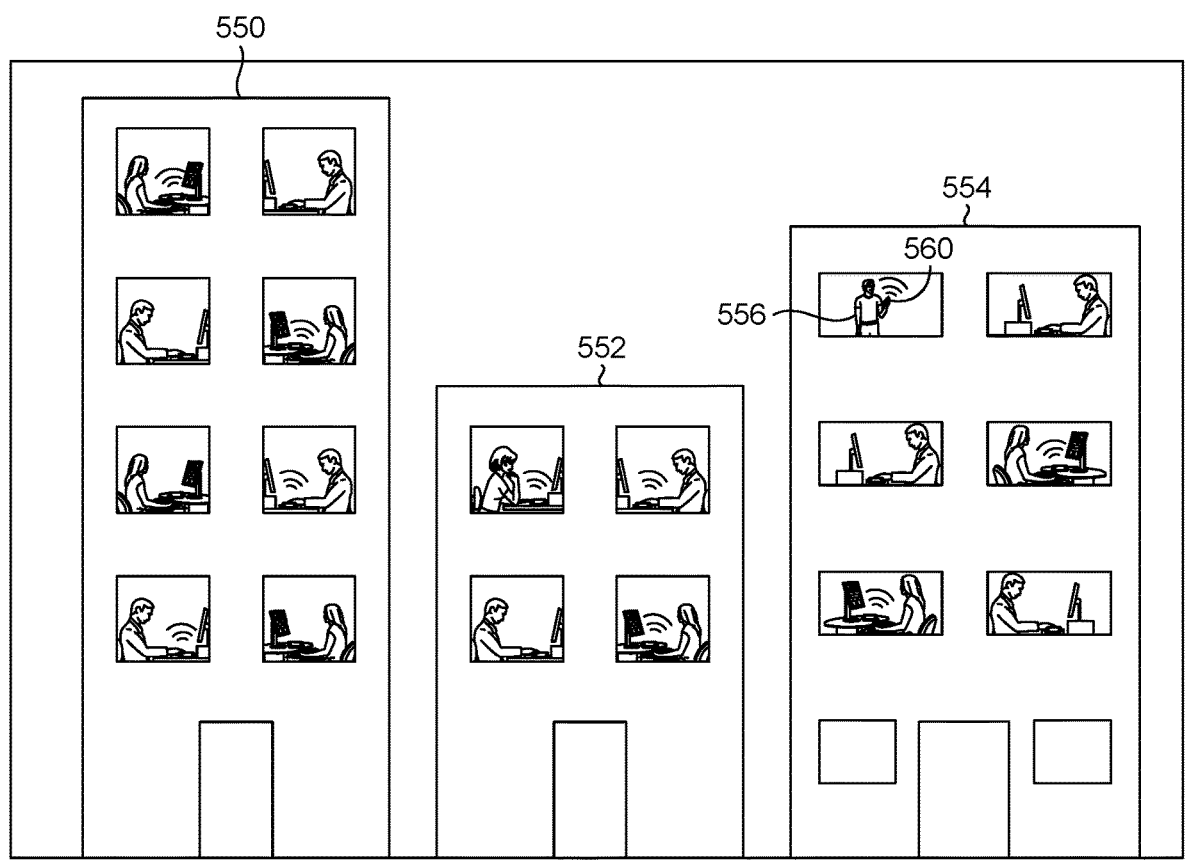

FIGS. 5a-5c illustrate active wireless communication sessions in three different settings. To further illustrate the features of the system described herein, additional examples utilizing FIGS. 5a-5c with FIG. 4 are presented herein. First, turning to FIG. 5a with FIG. 4, an active wireless communication session is ongoing between the WCD 401 and an access point 410. While not shown in FIG. 5a, at least one access point 410, similar to or the same as access point 410 shown in FIG. 4 is located within a specific distance from the location shown in FIG. 3. Individual 502 is enjoying her morning coffee while the WCD 401 is transmitting signal 504 to an access point. Once the historical data is collected by the first sector data collector 216 and the WCD data collector 218, the analyzer 220 will analyze the historical data and then the determiner 222 will determine the first maximum uplink power and the second maximum uplink power. Once the first maximum uplink power is determined and the second maximum uplink power is determined, the instructor 224, will instruct the WCD 401 to dynamically modify the first maximum uplink power and the second maximum uplink power that will be used by the WCD 401. As such, the first transmitter 434 of WCD 401 will transmit a first wireless uplink signal 446 to the first node 412 using the first maximum uplink power, and the second transmitter 432 of WCD 401 will use the second maximum uplink power to transmit the second wireless uplink signal to the second node 422.

For the purpose of this non-limiting example, the wireless communication session between the WCD 401 and access point 410 is taking place around 8:00 AM in a suburban neighborhood with a small population surrounding. As such, the dynamic power allocation engine 212, via the first sector data collector 216, collects historical data for the first sector and historical data for the first WCD to utilize in determining the maximum uplink powers for the current wireless communication session. The historical data will include, but is not limited to, the past location of the WCD 401 within the sector, past locations of one or more other WCDs within the sector at the same time of the day, the number of other WCDs 401 within a predetermined radius or area that actively communicated with the access point 410 in the past during the same time period, current noise interference, and other historical data such as average noise interference within the specific area or cell during the same time period on the same days of the week. Analyzer 220 then takes the collected historical data and analyzes the data.

Following this, the determiner 222 will determine the updated first maximum uplink power and the second maximum uplink power for each of the first transmitter 434 and the second transmitter 432. The first maximum uplink power and the second maximum uplink power will be transmitted by the first transmitter 434 and the second transmitter 432 via the first communication protocol 470 and the second communication protocol 472. In this example, the determiner 222 may determine that historical data shows low noise interference during the early morning hours in the geographic area where individual 302 is located. As such, the determiner 222 may determine that the first maximum uplink power for the first communication protocol 470 is 0 dBm while the second maximum uplink power for the second communication protocol 72 is 15 dBm.

Following this, the instructor 224 proactively instructs the WCD 401 to dynamically modify each of the first maximum uplink power and the second maximum uplink power, wherein the first maximum uplink power is used by a first transmitter of the WCD to transmit a first wireless uplink signal to the first access point and the second maximum uplink power is used by a second transmitter of the WCD to transmit a second wireless uplink signal to the second access point. In the instance where the first communication protocol is a 5G wireless communication protocol and the second communication protocol is a 4G communication protocol, the updated transmission power for the 5G communication protocol would be 0 dBm while the 4G communication protocol would be 15 dBm. While this example discusses an updated transmission power for 0 dBm for the first communication protocol, it is contemplated that any range of transmission power within the maximum range (up to 29 dBm) for the first communication protocol is possible. It is contemplated that each of the first maximum uplink power and the second maximum uplink power may be between 15 dBM and 29 dBm.

The automatic and proactive instruction to modify each of the first maximum uplink power and the second maximum uplink power described herein creates a more effective and better user experience since the transmission power of the uplink and downlink signals between the access point 410 and the WCD 401 is immediately and automatically set to the most effective transmission power levels based on the at least one set of data analyzed. This is an important and useful improvement to prior technology, where the instructor would be required to communicate multiple times to the access point 410 updated transmission powers for each communication protocol. In other words, in previous systems, the instructor 224 would have had to continue to adjust the first maximum uplink power and the second maximum uplink power over a time period prior to reaching the most effective transmission power for the best wireless communication session between the WCD 401 and the access point 410.

Next, looking at FIG. 5b in view of FIG. 4, there are multiple vehicles utilizing WCDs within one small area in FIG. 5b during rush hour (e.g. 5:00 PM on a Monday), which would lead to higher noise interference levels than may be seen in FIG. 5a. As such, the analyzer 220 analyzes the historical data collected regarding interference level for multiple WCDs (e.g. WCD 518, WCD 401, WCD 522 and WCD 524) so the determiner 222 can then determine how the first maximum uplink power and the second maximum uplink power should be modified. Here, the determiner 222 may determine that first maximum uplink power used by the first transmitter 434 via the first communication protocol (e.g. 5G) 470 and the second maximum uplink power used by the second transmitter 432 via the second communication protocol 472 (e.g. 4G)'s needs to be higher based on the historical data regarding the high level of noise interference coming from multiple WCDs within the same area during rush hour. As such, the determiner 222 may determine that the first maximum uplink power be modified to 12 dBm and the second maximum uplink power be modified to 12 dBm.

It is further contemplated that each WCD 401, 518, 522, and 524 may have different modified first and second maximum uplink powers based on each individual WCD. For example, not every WCD shown may be capable of utilizing 5G wireless technology. As such, if WCD 401 is equipped for 4G only, the first maximum uplink power would be 0 dBm and the second maximum uplink power may be determined to be 20 dBm to have an optimal wireless communication session.

Additionally, the system 400 may begin the process of proactively determining the first maximum uplink power and the second maximum uplink power to be used by WCDs 401, 518, 522, and 524 as soon as or prior to the device entering the specific area. Based on artificial intelligence and historical data including past WCD locations over a period of time, the system 400 may be able to predict the route of an individual such as individual 512. As such, the instructor 224 may instruct the WCD 401 to communicate to the access point 410 as soon as the device has entered the specific area so that the first maximum uplink power and the second maximum uplink power are modified almost immediately. This is advantageous as it will allow for a more optimal, efficient, and effective wireless communication session if the first maximum uplink power and the second maximum uplink power effectively set to the appropriate level immediately rather than going through a ramp up time where the transmission power might be incrementally increased or decreased on each protocol until the correct transmission power for each communication protocol is reached.

Similarly, viewing FIG. 5c with FIG. 4, the components of the dynamic power allocation engine 212 will collect, analyze, determine and instruct the WCD 560 as previously described. In FIG. 5c, individual 556 is using a WCD 560 within a high rise building 554 surrounded by several other high rise buildings 550, 552, and 554 in which there are several individuals utilizing WCDs. The image depicted in FIG. 5c shows a scenario in which the level of noise interference would be higher than that seen in FIGS. 5a and 5b due to the high number of individuals within the area utilizing WCDs. As such, the determiner 222, based on historical data collected, will determine the first maximum uplink power and the second maximum uplink power for the first transmitter and second transmitter for individual 556's WCD 560. Based on the specific capabilities of the individual 556's WCD 560, the determiner 222 will determine what maximum uplink power is needed in order to have the optimal wireless communication session. Given how many users may be utilizing their WCDs in this area, the determiner 222 may determine, based on historical data for the sector and the WCD 560, that the first maximum uplink power and the second maximum uplink power should each be set at 13 dBm for an optimal user experience. After the determination is made, the instructor 224 will proactively instruct the WCD 560 to modify the first maximum uplink power and the second maximum uplink power to the access point 410.

Additionally, the system 400 may periodically or on a predetermined schedule, collect the sector historical data and the specific WCD, such as WCD 401's historical data to determine the first maximum uplink power and the second maximum uplink power. For example, if the initial determination of 13 dBm was made at 1:00 PM on a weekday (Monday through Friday), then the system 400 may repeat the process again at 6:00 PM. At 6:00 PM. The system 400 may utilize the historical data and determine that the first maximum uplink power and second maximum uplink power for each communication protocol can be decreased since the noise interference has decreased after prime work hours. Based on this determination, the instructor 224 would then instruct the WCD 401 to modify the first maximum uplink power and the second maximum uplink power. As such, using the first maximum uplink power, the first transmitter 434 of the WCD 401 would transmit a first wireless uplink signal, via the first communication protocol 470 to the access point 410. The second transmitter 432 would utilize the second maximum uplink power transmit a second wireless uplink signal to the second node 422. This is unlike previous systems where the first and second maximum uplink powers would have been adjusted incrementally until the correct level was achieved based on the updated data analysis. Instead, in the current system, the determination and modification of the first maximum uplink power and second maximum uplink power occurs without any sort of ramp up or down time. While various examples have been presented for the first maximum uplink and second maximum uplink power levels, any and all combination of power levels that do not exceed the maximum power transmission allowable for each protocol is contemplated herein.

Figure 6:
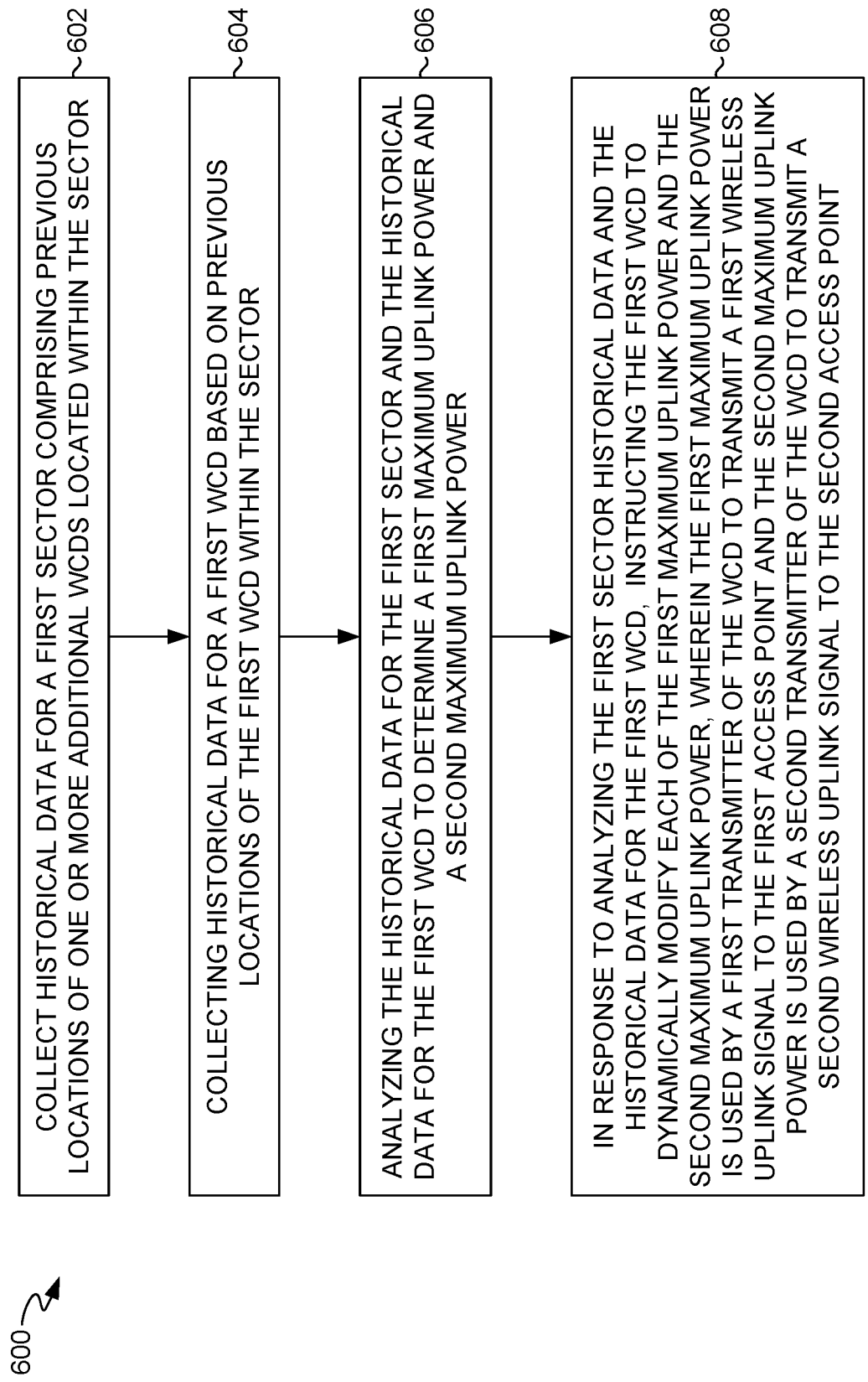
FIG. 6 a flow diagram of an exemplary method for dual connectivity power control, in accordance with aspects herein.

FIG. 6 depicts a flow diagram of an exemplary method 600 for the dynamic allocation of maximum uplink power, in accordance with aspects of the present disclosure. Initially, at block 602, the first sector data collector 216 collects historical data for a first sector comprising previous locations of one or more additional WCDs located within the first sector. Because the load on a sector may impact the quality of a wireless communication session between a single WCD and an access point, collecting historical data for multiple WCDs will allow the system to analyze such data and determine the most effective maximum uplink powers, leading to a more optimal wireless communication session.

At block 604, the WCD historical data is collected, by the WCD data collector 218, for the first WCD based on previous locations of the first WCD within the sector. The historical data for the first WCD will include, but is not limited to, the first WCD's previous locations, data regarding previous communication sessions including previous first maximum uplink powers and second maximum uplink powers. At block 606, the analyzer 220 analyzes the historical data for the first sector and the historical data for the first WCD collected and the determiner 222 determines a first maximum uplink power and a second maximum uplink power. Then, the instructor 224, instructs, at block 608, the first WCD to dynamically modify each of the first maximum uplink power and the second maximum uplink power, wherein the first maximum uplink power is used by a first transmitter of the WCD to transmit a first wireless uplink signal to the first access point and the second maximum uplink power is used by a second transmitter of the WCD to transmit a second wireless uplink signal to the second access point.

While not shown in FIG. 6, prior to instructing the first WCD to dynamically modify the first maximum uplink power and the second maximum uplink power at block 608, an access point, and/or any other processor such as a network controller, or any other device, engine, or component communicatively coupled to the wireless communication network and capable of determining one or more network parameters may receive an indication that a first wireless downlink signal from a first access point and a second wireless has been transmitted by a second access point to the first WCD.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamically allocating maximum total uplink power in a first wireless communication device (WCD), the system comprising:

a first access point, the first access point configured to transmit a first wireless downlink signal to a first WCD;
a second access point, the second access point configured to transmit a second wireless downlink signal to the first WCD; and
a processor, the processor configured to perform operations comprising:
collect historical data for a first sector comprising previous locations of one or more additional WCDs located within the first sector;
collect historical data for the first WCD based on previous locations of the first WCD within the first sector;
analyze the historical data for the first sector and the historical data for the first WCD to determine a first maximum uplink power and a second maximum uplink power; and
in response to analyzing the historical data for the first sector and the historical data for the first WCD, instructing the first WCD to dynamically modify each of the first maximum uplink power and the second maximum uplink power, wherein the first maximum uplink power is used by a first transmitter of the first WCD to transmit a first wireless uplink signal to the first access point and the second maximum uplink power is used by a second transmitter of the first WCD to transmit a second wireless uplink signal to the second access point.

2. The system of claim 1, wherein the first access point and the second access point are co-located at a common site.

3. The system of claim 1, wherein the first access point is located at a first site and the second access point is located at a second site.

4. The system of claim 1, wherein the first access point communicates with the first WCD using an eNodeB.

5. The system of claim 1, wherein the first access point communicates with the first WCD using a gNodeB.

6. The system of claim 1, wherein the first access point communicates with the first WCD using a first communication protocol and the second access point communicates with the first WCD using a second communication protocol.

7. The system of claim 6, wherein the first communication protocol is a 4G network technology.

8. The system of claim 6, wherein the second communication protocol is a 5G network technology.

9. The system of claim 1, wherein each of the first maximum uplink power and the second maximum uplink power is between 15 dBm and 29 dBm.

10. The system of claim 1, wherein a sum of the first maximum uplink power and the second maximum uplink power is 29 dBm.

11. The system of claim 1, wherein the first maximum uplink power does not equal the second maximum uplink power.

12. A method for dynamic power allocation in a first wireless communications device (WCD), the method comprising:
collecting historical data for a first sector comprising previous locations of one or more additional WCDs located within the first sector;
collecting historical data for a first WCD based on previous locations of the first WCD within the first sector;
analyzing the historical data for the first sector and the historical data for the first WCD to determine a first maximum uplink power and a second maximum uplink power; and in response to analyzing the historical data for the first sector and the historical data for the first WCD, instructing the first WCD to dynamically modify each of the first maximum uplink power and the second maximum uplink power, wherein the first maximum uplink power is used by a first transmitter of the first WCD to transmit a first wireless uplink signal to a first access point and the second maximum uplink power is used by a second transmitter of the first WCD to transmit a second wireless uplink signal to a second access point.

13. The method of claim 12, wherein the first transmitter transmits a first uplink signal using a first communication protocol and the second transmitter transmits a second uplink signal using a second communication protocol, the first communication protocol being different than the second communication protocol.

14. The method of claim 13, wherein the first communication protocol is a 4G network technology and the second communication protocol is a 5G network technology.

15. The method of claim 12, wherein the first access point is co-located at the same site as the second access point.

16. The method of claim 12, wherein the historical data for the first sector further comprises pathloss associated with a communication between the first WCD and each of the first access point and the second access point.

17. The method of claim 12, wherein a sum of the first maximum uplink power and the second maximum uplink power does not exceed a WCD-native maximum total uplink power.

18. A non-transitory computer storage media storing computer-usable instructions that, when used by one or more processors, cause the one or more processors to:
collect historical data for a first sector comprising previous locations of one or more additional WCDs located within the first sector;
collect historical data for a first WCD based on previous locations of the first WCD within the first sector;
analyze the historical data for the first sector and the historical data for the first WCD;
in response to analyzing the historical data for the first sector and the historical data for the first WCD, instructing the first WCD to dynamically modify each of a first maximum uplink power and a second maximum uplink power, wherein the first maximum uplink power is used by a first transmitter of the first WCD to transmit a first wireless uplink signal to a first access point and the second maximum uplink power is used by a second transmitter of the first WCD to transmit a second wireless uplink signal to a second access point.

19. The non-transitory computer storage media of claim 18, wherein prior to instructing the first WCD to dynamically modify the first maximum uplink power and the second maximum uplink power, receiving an indication that a first wireless downlink signal has been received the first WCD from the first access point and a second wireless downlink signal has been received by the first WCD from the second access point.

20. The non-transitory computer storage media of claim 18, wherein the first WCD communicates with the first access point using a first communication protocol and the first WCD communicates with the second access point using a second communication protocol.

* * * * *